US005384935A

United States Patent [19]

Maier-Hunke et al.

[11] Patent Number: 5,384,935

[45] Date of Patent: Jan. 31, 1995

[54] CLIP DEVICE

[75] Inventors: Horst-Werner Maier-Hunke, Iserlohn-Sümmern; Günter Rupprecht, Arnsberg, both of Germany

[73] Assignee: "Durable" Hunke & Jochheim GmbH & Co. KG, Iserlohn, Germany

[21] Appl. No.: 80,142

[22] Filed: Jun. 18, 1993

[30] Foreign Application Priority Data

Jun. 19, 1992 [DE] Germany ............................ 4220406

[51] Int. Cl.[6] ............................ B42F 1/00; F16B 2/00

[52] U.S. Cl. .................................... 24/67 R; 24/67.3; 24/543

[58] Field of Search ...................... 24/67 R, 67.3, 67.9, 24/543

[56] References Cited

U.S. PATENT DOCUMENTS

| | | | |
|---|---|---|---|
| 489,794 | 1/1893 | Dyre | 24/67 R |
| 976,421 | 11/1910 | Wolff | 24/67.3 |
| 1,292,124 | 1/1919 | Stenquist | 30/358 |
| 2,223,978 | 12/1940 | Dew | 24/67 R |
| 3,638,282 | 2/1972 | Larsson | 24/67.3 |
| 3,698,681 | 10/1972 | Lacey | 24/543 |
| 3,914,892 | 10/1975 | Mohr | 24/67.3 |
| 4,623,169 | 11/1986 | Hutten | 24/67.3 |
| 4,991,268 | 2/1991 | Ho | 24/67 R |
| 5,056,197 | 10/1991 | Cohen | 24/543 |

FOREIGN PATENT DOCUMENTS

| | | | |
|---|---|---|---|
| 0059442 | 9/1982 | European Pat. Off. . | |
| 4036882 | 11/1990 | Germany . | |
| 0000246 | of 1890 | United Kingdom | 24/67.3 |

*Primary Examiner*—Victor N. Sakran
*Attorney, Agent, or Firm*—Mark P. Stone

[57] ABSTRACT

In a clip device having two clip legs (1,2) connected via a spine (3), one (1) of the two clip legs (1,2) consists of two sections (1*a*, 1*b*) which are connected together via a joint (4). The section (1*a*), facing the spine (3), of the one clip leg (1) is connected via a further joint (5) to the spine (3) and, via an elastic web forming a spring (6), to the other clip leg (2). In order to receive an article to be clipped (7) the section (1*b*), facing away from the spine (3), of the one clip leg (1) is first folded upwards in the manner of a pivot lever and, after introduction of the article to be clipped (7) between the clip legs (1,2), folded back into its starting position in which it presses the article to be clipped against the clip leg (2) without joint by means of a clip strut (8) assuming an engagement position.

28 Claims, 5 Drawing Sheets

CLIP DEVICE

BACKGROUND OF THE INVENTION

The invention relates to a clip device for articles to be clipped such as sheet stacks, notice boards, maps, calendars or the like having two clip legs connected together via a spine, one of which consists of two sections which are connected together at a distance from the spine by a joint extending parallel to the spine and of which the section connected to the part of the joint facing away from the spine is designed as an operating handle and is provided with a clip strut which in the clipping position assumes, with respect to the other clip leg, an engagement position which is defined by at least one stop and in which said clip strut is pressed resiliently against the article to be clipped or against the other clip leg which forms one piece with the spine.

DE 40 36 882 Cl discloses a clip device of the type under consideration made of plastic in which the clip leg without joint, the spine and the section, connected to the spine, of the clip leg having the joint are designed as a one-piece spring clip, the spine having essentially the shape of a half cylinder. In the known device problems can occur if, for example, thick and thin sheet-article stacks are to be deposited in succession. In such a case hysteresis phenomena impair the clipping capacity of the clip device in such a manner that after the previous clipping of a thick stack of sheet articles, the reliable clipping of a thin stack of sheet articles or of a single sheet is no longer ensured.

SUMMARY OF THE INVENTION

The invention is based on the object of forming a clip device of the generic type under consideration in such a manner that it permits the reliable firm clipping of articles to be clipped of both comparatively large and small thickness, in particular in alternating succession, care being taken at the same time to maintain the original clipping force for a long time. This object is achieved according to the invention in that, of the two sections, connected together by a joint, of the one clip leg, that section which lies between the spine and the joint connecting the two sections together is connected to the spine in the region of the spine via a further joint and in that at least one spring which, in the clipping position, presses the clip strut against the article to be clipped or against the other clip leg acts on this section.

The clip device according to the invention has the advantage that, in order to obtain a perfect clipping action, it utilizes the force of the spring, whose material properties take into account primarily, if not exclusively, the functions to be performed by a spring. In other words, in the selection of the material for the clip leg and the spine of the clip devices, no consideration need be paid to requirements which have to be fulfilled in order to obtain a perfect clipping action, dependent on the characteristic curve of the spring, of the clip device.

BRIEF DESCRIPTION OF THE DRAWINGS

Further details and features of the invention are given in the subclaims and the following description of several especially advantageous exemplary embodiments illustrated in the accompanying drawing, in which:

BEST MODES FOR CARRYING OUT THE INVENTION

Figure 1:
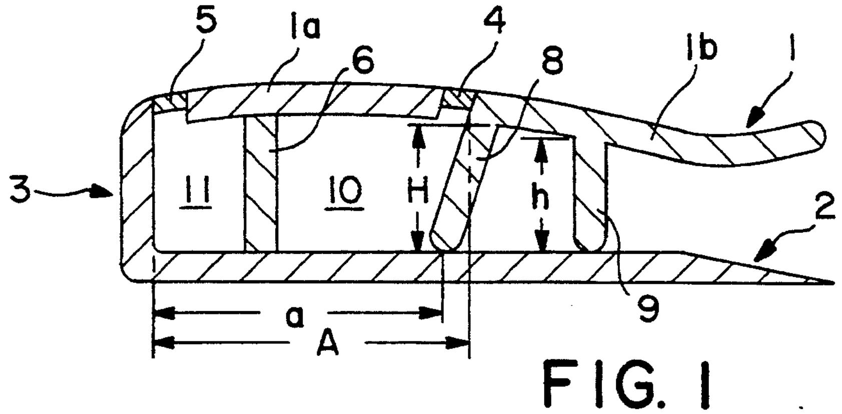
FIG. 1 shows the cross-section of a first clip device designed as a clip bar in the starting position.
Figure 2:
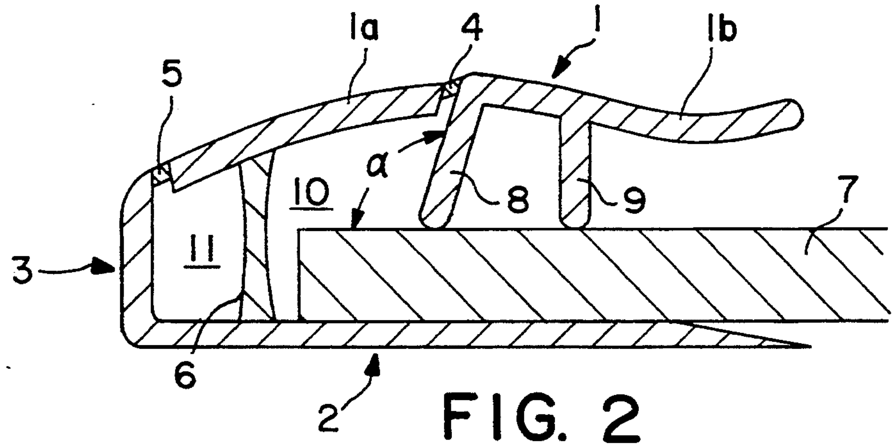
FIG. 2 shows the cross-section of the clip device according to FIG. 1 in a clipping position.
Figure 3:
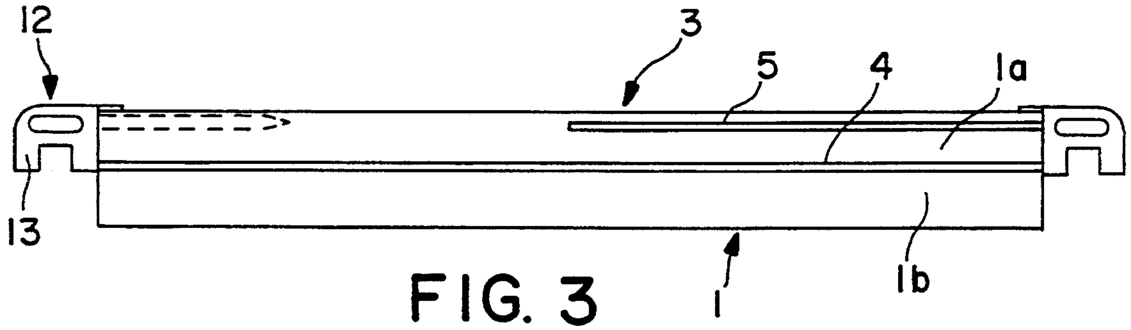
FIG. 3 shows, on an enlarged scale compared with FIG. 1, the plan view of a clip device which has a cross-section according to FIG. 1 and has at its ends plugs for hanging up in a suspension file.
Figure 4:
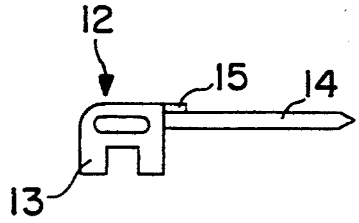
FIG. 4 shows the side view of one of the plugs for the clip device according to FIG. 3.
Figure 5:
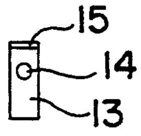
FIG. 5 shows the end view of the plug according to FIG. 4.
Figure 6:
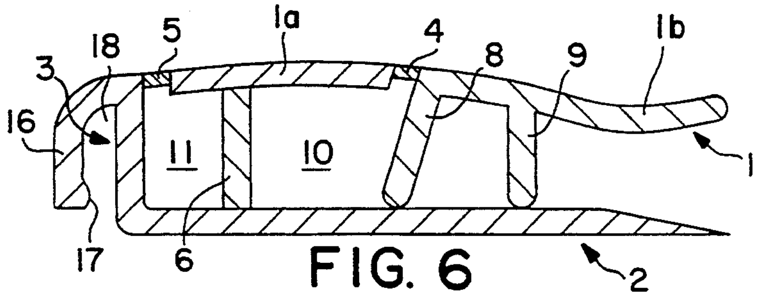
FIG. 6 shows the cross-section of a further clip device designed as a clip bar, in the starting position.
Figure 7:
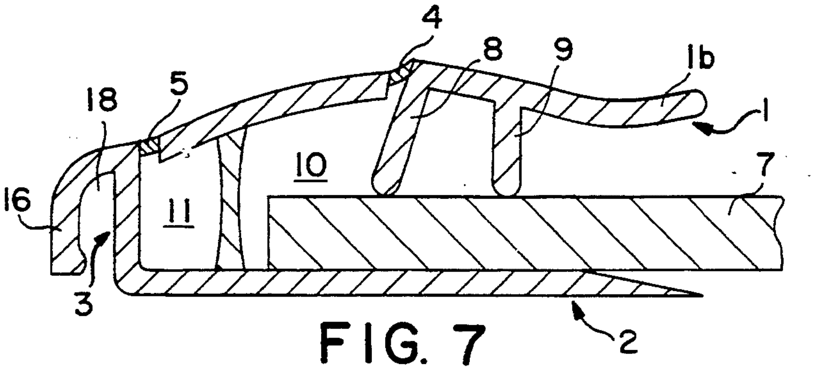
FIG. 7 shows the cross-section of the clip device according to FIG. 6 in a clipping position.
Figure 8:
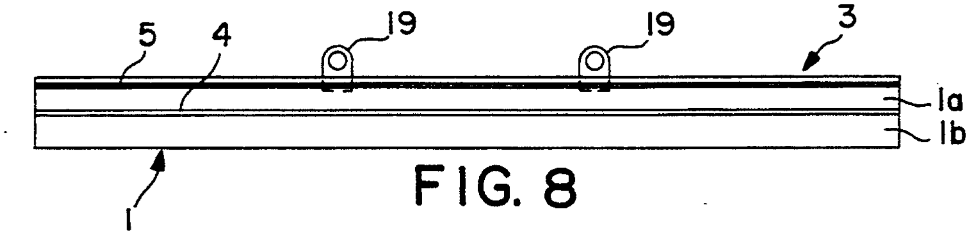
FIG. 8 shows, on a reduced scale compared with FIG. 6, the plan view of a clip device which has a cross-section according to FIG. 6 and in the retaining groove of which individual filing eyelets are inserted.

The clip device according to FIGS. 1 to 3 has two clip legs 1 and 2 and a spine 3. The clip leg 1 is subdivided into two sections 1*a* and 1*b* which are connected together via a first joint 4. A second joint 5 connects section 1*a* of the clip leg 1 to the spine 3 of the clip device.

Between section 1*a* of the clip leg 1 and clip leg 2, there extends a web of elastic material which forms a spring 6 and, in conjunction with the second joint 5, serves to improve the clip capability of the clip device, both as regards to the thickness of the article to be firmly clipped and as regards the permanency.

As can be seen in FIG. 2, the respectively to be received article to be clipped 7, which is formed for example by a sheet stack, is firmly clipped between the clip leg 2 and a clip strut 8 whose engagement position with respect to the clip leg 2 is determined by a stop 9. The clip strut 8 and the stop 9 are formed by webs which are arranged such that the distance A between the spine 3 of the clip device and the connecting point of the first joint 4 to the section 1*b* of the clip leg is, in the engagement position, greater than the smallest distance a between the spine 3 and the point at which the free end of the clip strut 8 is supported on the clip leg 2 or on the article to be clipped 7; the clip strut 8 is inclined with respect to the clip leg 2 and together with the latter encloses an angle $\alpha$ of 100° to 110°. With the firm clipping of the article 7, the section 1*b* of the clip leg 1, considered in FIG. 1, is pivoted in the counterclockwise direction to the extent that the article 7 can be readily inserted into the interspace 10 between the clip legs 1 and 2. Subsequently, section 1*b* is pivoted back until it assumes the position which is shown in FIG. 2 and in which it is held automatically. On account of the elasticity of the web forming the spring 6, neither a reduction of the clip force nor a loss of the clip action need be feared if the clip device is used successively for articles to be clipped of different thickness.

The hollow space 11 between the spine 3 and the web 6 of the clip device can be utilized for accommodating plugs 12 and permits the use of the clip device as a filing bar for suspension files, as shown in FIG. 3. Each plug 12 has a hanging-up part 13, a bolt 14 which can be inserted into the hollow space 11 and a holding lip 15.

In FIGS. 6, 7, 8 and 11, a slightly modified clip device is shown, the same reference numerals as in the embodiment described above being used for parts corresponding to one another and only the differences being discussed below.

Figure 12:
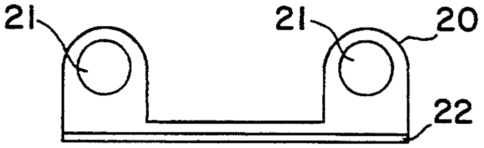
FIG. 12 shows, on an enlarged scale compared with FIG. 11, the front view of the double filing eyelet for the clip device according to FIG. 11.
Figure 13:
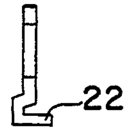
FIG. 13 shows the side view of the double filing eyelet according to FIG. 12.

The clip device according to FIGS. 6, 7, 8 and 11 is, like the clip device according to FIGS. 1 to 3, designed as a clip bar and, like these, consists of a coextruded profile section. It is provided in the region of its spine 3 with an arm 16 which bears at its end a lug 17 and, together with the spine 3, forms a retaining groove 18 into which the individual filing eyelets 19, according to FIGS. 9 and 10, or double filing eyelets 20, according to FIGS. 12 and 13, can be inserted. Both eyelet types have filing holes 21 and retaining anchors 22 which are adapted to the clear inner space of the retaining groove 18 and can be introduced from the side into the retaining groove 18 and held therein by frictional connection at the respectively provided point.

Figure 14:
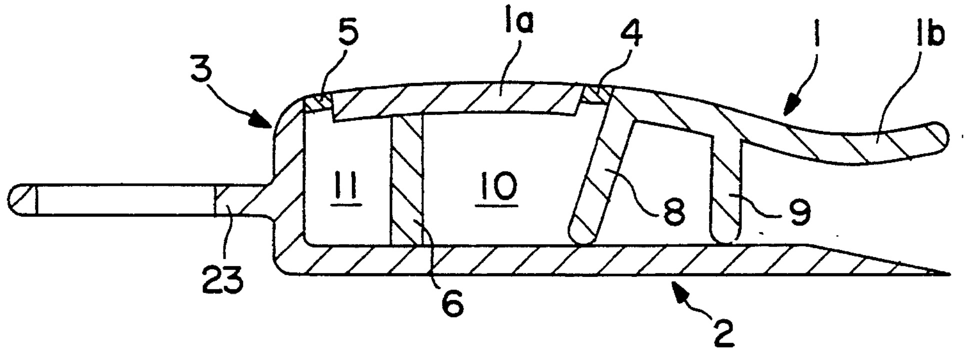
FIG. 14 shows the cross-section of a further clip device designed as a clip bar, in the starting position.
Figure 15:
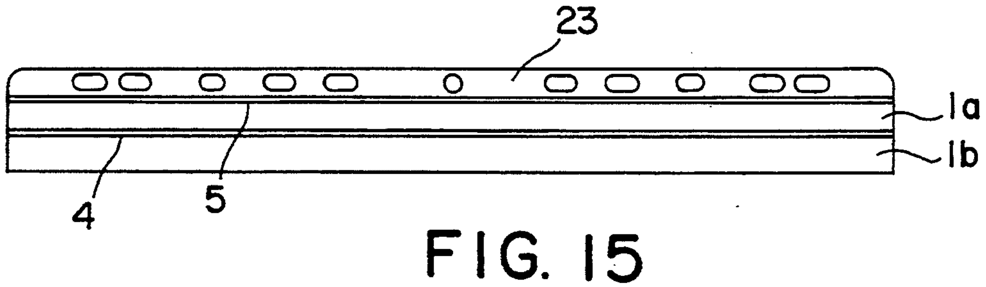
FIG. 15 shows, on a reduced scale compared with FIG. 14, the plan view of a clip device with a cross-section according to FIG. 14, which is provided in the region of its spine with universal punched elongated holes.
Figure 16:
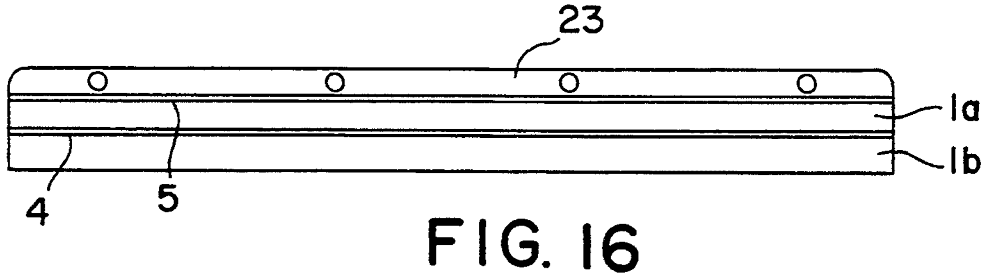
FIG. 16 shows a plan view corresponding to FIG. 15 of a clip device which is provided in the region of its spine with four punched holes.

A clip device with integral filing tab 23 is shown in FIGS. 14 to 16 in which the parts corresponding to the preceding embodiments are also assigned the same reference numerals. As shown in FIG. 15, the filing tab 23 can be provided with universal punched elongated holes or else, as shown in FIG. 16, with edge holes for filing in document files having two-hole or four-hole mechanisms. The particular holes are punched subsequently to a coextrusion process which permits a particularly economical production of the clip devices illustrated. If required, in the embodiment according to FIGS. 14 to 16, the hollow space 11 can also be used to receive plugs 12 in order to accommodate the clip device in a suspension file.

Figure 17:
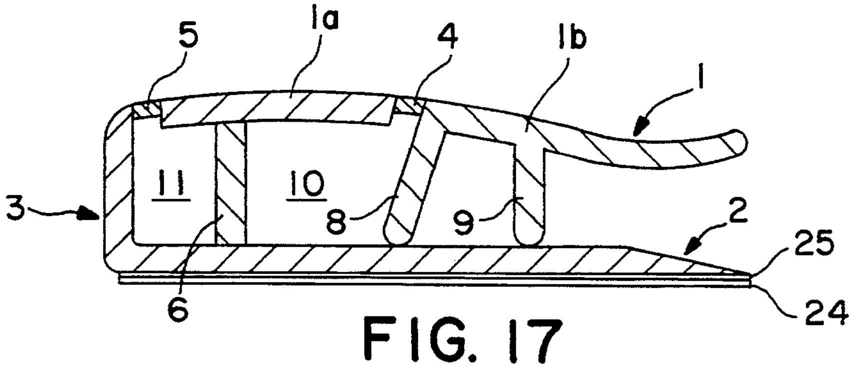
FIG. 17 shows the cross-section of a clip device designed as holding clip for a writing base.
Figure 18:
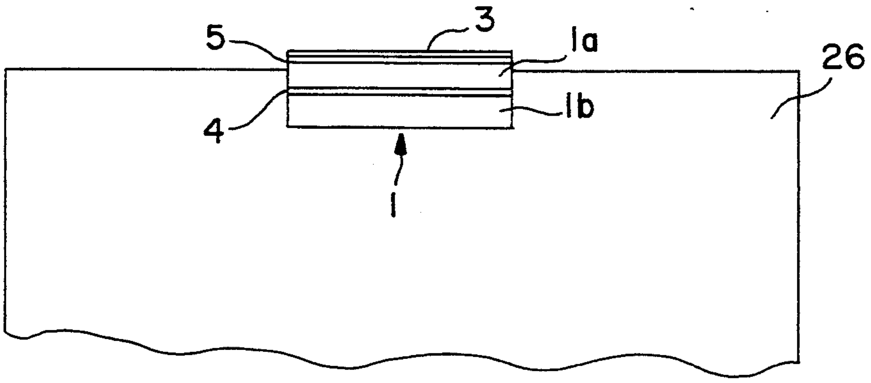
FIG. 18 shows the plan view of a writing board equipped with a clip device according to FIG. 17.

FIG. 17 shows the cross-section of a clip device, the clip leg 2 of which is provided on its outer side with an adhesive layer 25 covered with a peel-off film 24, which adhesive layer 25 permits the problem-free attachment of the clip device to a writing board 26, as shown in FIG. 18.

Figure 9:
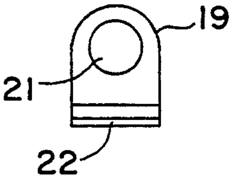
FIG. 9 shows, on an enlarged scale with respect to FIG. 8, the front view of an individual filing eyelet for the clip device according to FIG. 8.
Figure 10:
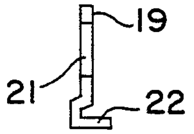
FIG. 10 shows the side view of the individual filing eyelet according to FIG. 9.
Figure 11:
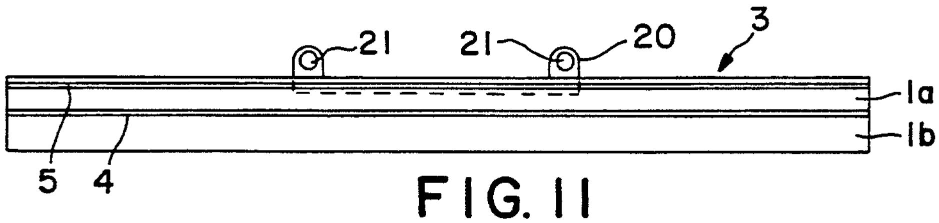
FIG. 11 shows, on a reduced scale compared with FIG. 6, the plan view of a clip device which has a cross-section according to FIG. 6 and into the retaining groove of which a double filing eyelet is inserted.
Figure 19:
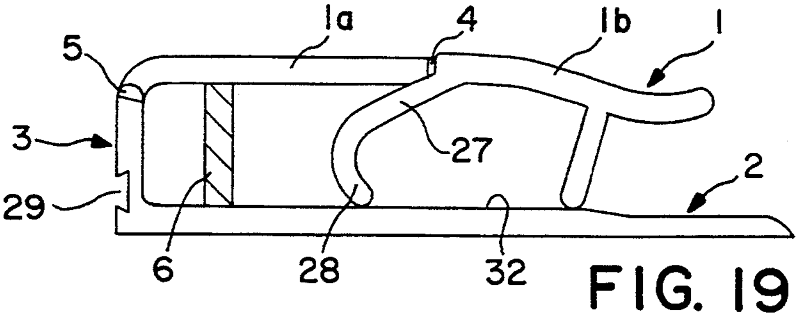
FIG. 19 shows the side view of a clip device which is designed as a clip bar and is provided with a swallowtail guide for fastening accessory parts.
Figure 20:
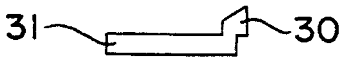
FIG. 20 shows the side view of a perforated strip which can be connected to the clip bar according to FIG. 19.
Figure 21:
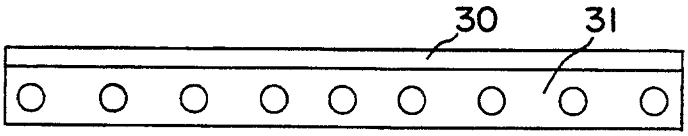
FIG. 21 shows the plan view of the perforated strip according to FIG. 20

Whereas in the above-described embodiments the clip strut serving to hold the article is of straight design, in the embodiment according to FIG. 19, a clip strut 27 is used whose end facing away from the joint 4 forms an arcuate sliding runner 28, which facilitates in particular the firm clipping of relatively large sheet article stacks. The spine 3 of the clip device according to FIG. 9 is equipped with a swallowtail guide 29 to receive the swallowtail profile 30 of a perforated strip 31. A further special feature of the clip device according to FIG. 19 consists in the side, facing the clip leg 1, of the clip leg 2 being provided with a non-slip covering 32. Finally, in order to relieve the joint 4, the clip strut 27 lies with its spine against an inclined surface, facing towards it, on the end, facing the joint 4, of section 1*a*.

Figure 22:
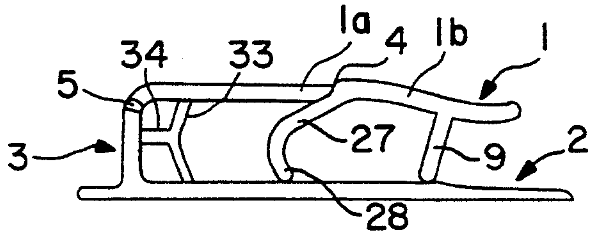
FIG. 22–29 shows side views of various modified clip devices.
Figure 23:
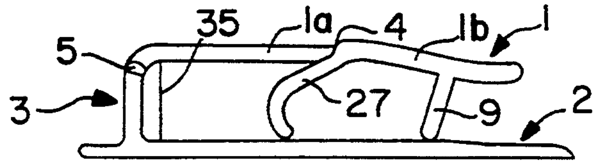
Figure 24:
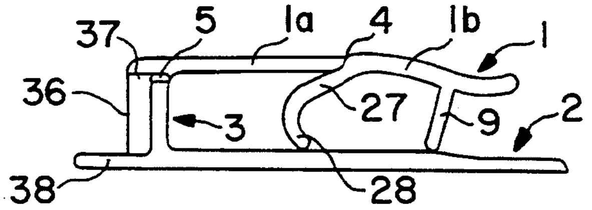
Figure 25:
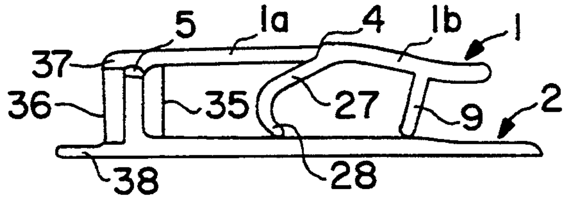

FIG. 22 shows a clip device having a spring 33 which is additionally connected via an arm 34 to the spine 3, whereas FIG. 23 shows a spring 35 which consists of an elastic web which is even in full-surface connection with the spine 3.

Figure 26:
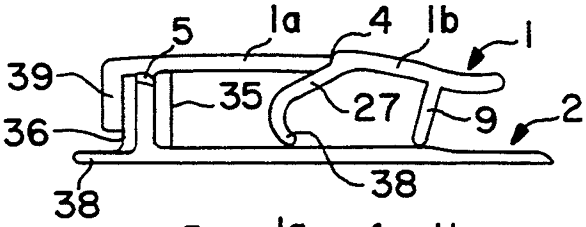

Instead of springs 6, 33 and 35, which are designed as tension springs, springs 36 designed as compression springs can also be used, either alone or in conjunction with in each case a spring 6, 33 or 35 designed as a tension spring. The use of compression springs 36, however, presupposes the presence of projections 37, 38 projecting over the spine 3, in which case a second projection 38 could be dispensed with in the case where an L-shaped projection 39 is used, as in FIG. 26.

Figure 27:
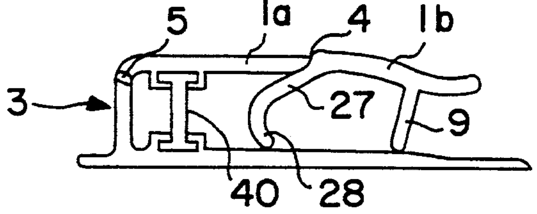
Figure 28:
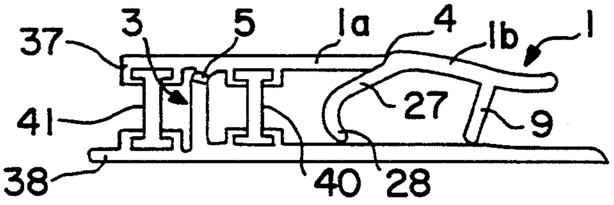

Whereas all the above-described clip devices, as already mentioned further above, are produced by coextrusion, that is to say by cutting to length from a coextruded profile bar, in the clip devices shown in FIGS. 27 and 28 the springs 40 or 40 and 41 can, if appropriate, also be connected retrospectively to a coextruded profile which forms only the clip legs 1 and 2, the spine 3 and the joints 4 and 5.

Figure 29:
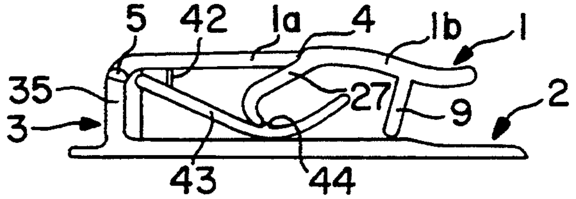

Finally, FIG. 29 shows a clip device in which there is arranged between the clip strut 27 and the clip leg 2 a guide tongue 43 which is acted on by a return spring 42, has an engagement lug 44 and must be overcome when the clip device is opened.

We claim:

1. A clip device for articles to be clipped such as sheet stacks, notice boards, maps, calendars or the like said device having two clip legs connected together via a spine, one of which comprises two sections which are connected together at a distance from the spine by a joint extending parallel to the spine and of which the section connected to the part of the joint facing away from the spine is designed as an operating handle and is provided with a clip strut which in the clipping position assumes, with respect to the other clip leg, an engagement position which is defined by at least one stop and in which said clip strut is pressed resiliently against the article to be clipped or against the other clip leg which forms one piece with the spine, wherein of the two sections connected together by a joint, of the one clip leg, that section which lies between the spine and the joint connecting the two sections together is connected to the spine in the region of the spine via a further joint and at least one spring which, in the clipping position, presses the clip strut against the article to be clipped or against the other clip leg acts on this section.

2. The clip device as claimed in claim 1, wherein the distance between the spine and the joint connecting the two sections of one clip leg together is, in the clipping position, greater than the distance between the spine and the contact point between the clip strut and the article to be clipped or the other clip leg.

3. The clip device as claimed in claim 2, wherein the spine and the clip leg comprise rigid PVC and the joints and the spring comprise a permanently elastic plastic.

4. The clip device as claimed in claim 2, wherein the section, having the clip strut, of the one clip leg is provided on the side of the clip strut facing away from the spine with a stop defining its engagement position.

5. The clip device as claimed in claim 3, wherein the clip strut and the stop are formed by webs, the height of the web forming the clip strut being greater than the height of the web forming the stop.

6. The clip device as claimed in claim 1, wherein the clip strut formed by a straight web encloses an obtuse angle, in the engagement position, with the part, disposed between its free end and the spine, of the clip leg without joint.

7. The clip device as claimed in claim 6, wherein the angle is 100° to 110°.

8. The clip device as claimed in claim 1, wherein the spine and the clip leg compromise rigid PVC and the joints and the spring comprises a permanently elastic plastic.

9. The clip device as claimed in claim 8, wherein at least the clip legs, the spine, the joints, the clip strut and the stop compromise a section of a coextruded profile.

10. The clip device as claimed in claim 1, wherein it has a spring designed as a tension spring.

11. The clip device as claimed in claim 10, wherein the spring is formed by an elastic web which joins the section, disposed between the two joints, of one clip leg to the other clip leg.

12. The clip device as claimed in claim 11, wherein the elastic web forming the spring is additionally connected to the spine.

13. The clip device as claimed in claim 12, wherein the elastic web forming the spring is in full-surface connection with the spine.

14. The clip device as claimed in claim 1, wherein it has a spring designed as a compression spring.

15. The clip device as claimed in claim 14, wherein the spring is formed by an elastic web which is arranged between two projections, protruding over the spine, of the two clip legs.

16. The clip device as claimed in claim 15, wherein the elastic web forming the spring is in full-surface connection with the spine.

17. The clip device as claimed in claim 16, wherein the projection of the clip leg including two sections is L-shaped in design and, together with the spine, encloses the elastic web on three sides over at least a part of its length.

18. The clip device as claimed in claim 15, wherein the projection of the clip leg including two sections is L-shaped in design and, together with the spine, encloses the elastic web on three sides over at least a part of its length.

19. The clip device as claimed in claim 1, wherein the spring(s) is/are detachably connected to the clip legs or to the projections, protruding over the spine, of the clip legs.

20. The clip device as claimed in claim 19, wherein the respective spring is anchored with T-shaped ends in swallowtail guides of the clip legs.

21. The clip device as claimed in claim 1, wherein is formed entirely from a section of a coextruded profile.

22. The clip device as claimed in claim 1, wherein it is provided in the region of its spine with a retaining groove.

23. The clip device as claimed in claim 1, wherein it is provided in the region of its spine with a filing tab.

24. The clip device as claimed in claim 1, wherein the clip leg without joint is provided on its outer side with an adhesive layer covered by a peelable film.

25. The clip device as claimed in claim 1, wherein the clip leg without joint is provided in the region of the clip strut with a non-slip covering on its inner side.

26. The clip device as claimed in claim 1, wherein the end, facing away from the joint connecting the sections of the one clip leg together, of the clip strut is designed as an arcuate sliding runner.

27. The clip device as claimed in claim 1, wherein between the clip strut and the clip leg opposite the clip leg including two sections connected together by a joint there is arranged a guide tongue.

28. The clip device as claimed in claim 25, wherein the guide tongue has an engagement lug for the clip strut.

* * * * *

UNITED STATES PATENT AND TRADEMARK OFFICE

CERTIFICATE OF CORRECTION

PATENT NO. : 5,384,935

DATED : January 31, 1995

INVENTOR(S) : Horst Werner Maier-Hunke, et al

It is certified that error appears in the above-indentified patent and that said Letters Patent is hereby corrected as shown below:

Col. 4,

Claim 1, Line 2: After "like", insert - -,- -.

Col. 5,

Claim 8, Line 2: Delete "compromise", and substitute --comprise--

Claim 8, Line 3: Delete "comprises", and substitute --comprise--

Claim 9, Line 3: Delete "compromise", and substitute --comprise--

Col. 6,

Claim 28, Line 1: Delete "25,", and substitute - -27, - -.

Signed and Sealed this

Sixteenth Day of May, 1995

*Attest:*

BRUCE LEHMAN

*Attesting Officer*

*Commissioner of Patents and Trademarks*